US008736173B2

(12) United States Patent
Nishitani et al.

(10) Patent No.: US 8,736,173 B2
(45) Date of Patent: May 27, 2014

(54) LIGHTING CONTROL APPARATUS WITH DIAGNOSIS AND WARNING FEATURE

(75) Inventors: Daisuke Nishitani, Kariya (JP); Yasutoshi Horii, Nagoya (JP); Takahito Nishii, Nagoya (JP); Tsutomu Kamizono, Nagoya (JP); Takahiro Nakano, Kariya (JP)

(73) Assignee: Denso Corporation, Kariya (JP)

( * ) Notice: Subject to any disclaimer, the term of this patent is extended or adjusted under 35 U.S.C. 154(b) by 206 days.

(21) Appl. No.: 13/135,232

(22) Filed: Jun. 29, 2011

(65) Prior Publication Data

US 2012/0001547 A1  Jan. 5, 2012

(30) Foreign Application Priority Data

Jun. 30, 2010  (JP) ................. 2010-149454

(51) Int. Cl.
B60Q 1/02  (2006.01)
(52) U.S. Cl.
USPC ........................................... 315/82; 307/10.8
(58) Field of Classification Search
USPC ............ 315/82; 307/10.1, 10.8; 340/901–905
See application file for complete search history.

(56) References Cited

U.S. PATENT DOCUMENTS

| | | | | |
|---|---|---|---|---|
| 4,064,482 A | * | 12/1977 | Maisch et al. | 340/444 |
| 6,201,318 B1 | * | 3/2001 | Guillory | 307/10.7 |
| 6,225,918 B1 | * | 5/2001 | Kam | 340/903 |
| 6,490,512 B1 | | 12/2002 | Niggemann | |
| 6,785,595 B2 | * | 8/2004 | Kominami et al. | 701/36 |
| 2003/0090905 A1 | * | 5/2003 | Uchida et al. | 362/465 |
| 2003/0151502 A1 | * | 8/2003 | Kam | 340/435 |
| 2004/0145496 A1 | * | 7/2004 | Ellis | 340/905 |
| 2006/0133100 A1 | | 6/2006 | Hayami | |
| 2007/0085494 A1 | | 4/2007 | Takeda et al. | |
| 2009/0167188 A1 | * | 7/2009 | Mueller et al. | 315/82 |

FOREIGN PATENT DOCUMENTS

| | | |
|---|---|---|
| JP | 2006-160119 | 6/2006 |
| JP | 2007-112237 | 5/2007 |
| JP | 2009-126264 | 6/2009 |

OTHER PUBLICATIONS

Office Action issued Jun. 25, 2013 in corresponding Chinese Application No. 201110186009.2 (with English translation).

* cited by examiner

*Primary Examiner* — Thienvu Tran
(74) *Attorney, Agent, or Firm* — Harness, Dickey & Pierce, PLC (57) ABSTRACT

A lighting control apparatus for a vehicle is provided which works to diagnose a malfunction of a light source which includes a plurality of lighting devices such as LEDs and emits light outside the vehicle. The lighting control apparatus determines a state of the vehicle. When the light source is determined to be malfunctioning, the lighting control apparatus operates the light source in one of predetermined warning lighting modes which is selected based on the state of the vehicle. This attracts a vehicle user's attention to the malfunctioning light source.

11 Claims, 7 Drawing Sheets

LIGHTING CONTROL APPARATUS WITH DIAGNOSIS AND WARNING FEATURE

CROSS REFERENCE TO RELATED DOCUMENT

The present application claims the benefit of priority of Japanese Patent Application No. 2010-149454 filed on Jun. 30, 2010, the disclosure of which is incorporated herein by reference.

BACKGROUND

1. Technical Field

The present invention relates generally to a lighting control apparatus for a vehicle which is equipped with a malfunction diagnosis feature and a warning feature to warn about a malfunction of a light source.

2. Background Art

Automotive illuminant devices such as headlamps, fog lamps, or tail lamps are known which have LEDs (Light Emitting Diodes) used as light sources. The illuminant devices are each equipped with a lighting control circuit which turns on or off the LEDs. Such a type of light sources are typically made up of arrays of LEDs or multi-chip LED modules.

The LEDs or the multi-chip LED modules may become defective due to an electric short, a leakage of current causing the LED to have an undesirable impedance, or a change in ambient temperature.

Japanese Patent First Publication No. 2007-112237 discloses an automotive diagnosis system which diagnoses the above malfunction of the LEDs. Specifically, the diagnosis system monitors a change in forward voltage at each of the LEDs and determines whether the LED is malfunctioning or not based on the monitored change. When one of the LEDs is found to be malfunctioning, the diagnosis system lights an LED installed near a driver's seat of the vehicle to warn the driver or other occupants (which will also be referred to as vehicle users below) of the malfunction of the LED.

The above type of a diagnosis system, however, has the drawback in that it is difficult for the users to see the warning lighting of the LED to identify which device is now malfunctioning. The users, thus, need to check the user's manual or call a maintenance service center to know the meaning of the warning message.

The use of the multi-chip LED module as the light source also faces the following disadvantage. When one of the LED chips of the multi-chip LED module is short-circuited, so that it fails to be turned on, it will result in a lack of a luminous intensity distribution of the multi-chip LED module, but the users may not realize such a failure because the multi-chip LED module continues to emit light as a whole. For example, in the case where headlamps attached to the right and left of the front of an automotive vehicle are each equipped with a multi-chip LED module, when one of the LED chips is malfunctioning, the other LED chips work to emit light. It is, thus, difficult for the users to visually identify which of the right and left headlamps is defective. The users may perceive in error that the LED installed near the driver's seat is malfunctioning.

SUMMARY

It is therefore an object to provide a lighting control apparatus for a vehicle which is equipped with a malfunction diagnosis feature and a warning feature to visually warn a person of a malfunction of a light source.

According to one aspect of an embodiment, there is provided a lighting control apparatus for a vehicle such as an automobile. The lighting control apparatus comprises: (a) a diagnosis circuit which diagnoses a malfunction of a light source which includes a plurality of lighting devices and emits light outside a vehicle; (b) a vehicle state determining circuit which determines a state of the vehicle; and (c) a malfunction warning circuit which operates the light source in one of predetermined warning lighting modes which is selected based on the state of the vehicle when the light source is determined by the diagnosis circuit as being malfunctioning.

Specifically, when the light source such as a headlamp or a tail lamp is found to be malfunctioning, the lighting control apparatus controls, for example, an operation of the light source in a flashing or a dimming mode or changes orientation of an optical axis of the light source to inform a vehicle user of the malfunction of the light source. The lighting control apparatus selects one of the warning lighting modes based on the state of the vehicle in order to facilitate the ease with which the vehicle user realizes the malfunction of the light source.

In the preferred mode of the embodiment, the vehicle state determining circuit determines whether the vehicle is running or not as the state of the vehicle. Specifically, the lighting control apparatus changes the warning lighting mode based on whether the vehicle is running or not, thereby warning about the malfunction of the light source while securing the user's safety or paying attention to environmental conditions of the vehicle.

When the vehicle state determining circuit determines that the vehicle is running, the malfunction warning circuit may be prohibited from operating the light source in one of the warning lighting modes. This allows the driver to focus on driving the vehicle without need for direct attention to the malfunctioning of the light source.

The vehicle state determining circuit may determine whether a vehicle user is getting in or out of the vehicle or not as the state of the vehicle. This enables the vehicle user to notice the malfunction of the light source inside or outside the vehicle.

The lighting control apparatus may also include a vehicle detector which detects the presence of another vehicle within an area illuminated by the light source. When no vehicle is detected in the area by the vehicle detector, and the light source is determined by the diagnosis circuit as being malfunctioning, the malfunction warning circuit changes orientation of a beam of the light emitted by the light source. For example, when the a preceding vehicle or an oncoming vehicle is not detected, the lighting control apparatus swivels or levels the light source to change the orientation of the beam of light emitted by the light source, thereby increasing the possibility that the vehicle user notices the malfunction of the light source. When another vehicle is detected, the lighting control apparatus does not change the orientation of the beam of light, thus producing no glare to dazzle the driver of, for example, the oncoming vehicle.

The light source may be installed in a headlamp of the vehicle.

According to another aspect of the embodiment, there is provided a lighting control apparatus for a vehicle which comprises: (a) a diagnosis circuit which diagnoses a malfunction of each of a plurality of light sources each of which includes a plurality of lighting devices and emit light outside a vehicle; (b) a vehicle state determining circuit which determines a state of the vehicle; and (c) a malfunction warning circuit which, when one of the light sources is diagnosed as being malfunctioning, operates only the one of the light sources in one of predetermined warning lighting modes which is selected based on the state of the vehicle. This enables the vehicle user to visually perceive which of the light source is now malfunctioning.

According to the third aspect of the embodiment, there is provided a lighting control system for a vehicle which comprises: (a) a light source which includes a plurality of lighting devices and emits light outside a vehicle; (b) an operating state sensor which monitors an operating state of the light source; (c) a vehicle state monitor which monitors a state of the vehicle to provide a signal indicative thereof; and (d) a lighting control apparatus. The lighting control apparatus includes (1) a diagnosis circuit which diagnoses a malfunction of the light source based on the operating state of the light source, as monitored by the operating state sensor; (2) a vehicle state determining circuit which determines the state of the vehicle based on the signal outputted from the vehicle state monitor; and (3) a malfunction warning circuit which operates the light source in one of predetermined warning lighting modes which is selected based on the state of the vehicle when the light source is determined by the diagnosis circuit as being malfunctioning.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment, but are for the purpose of explanation and understanding only.

In the drawings.

DESCRIPTION OF THE PREFERRED EMBODIMENT

Figure 1:
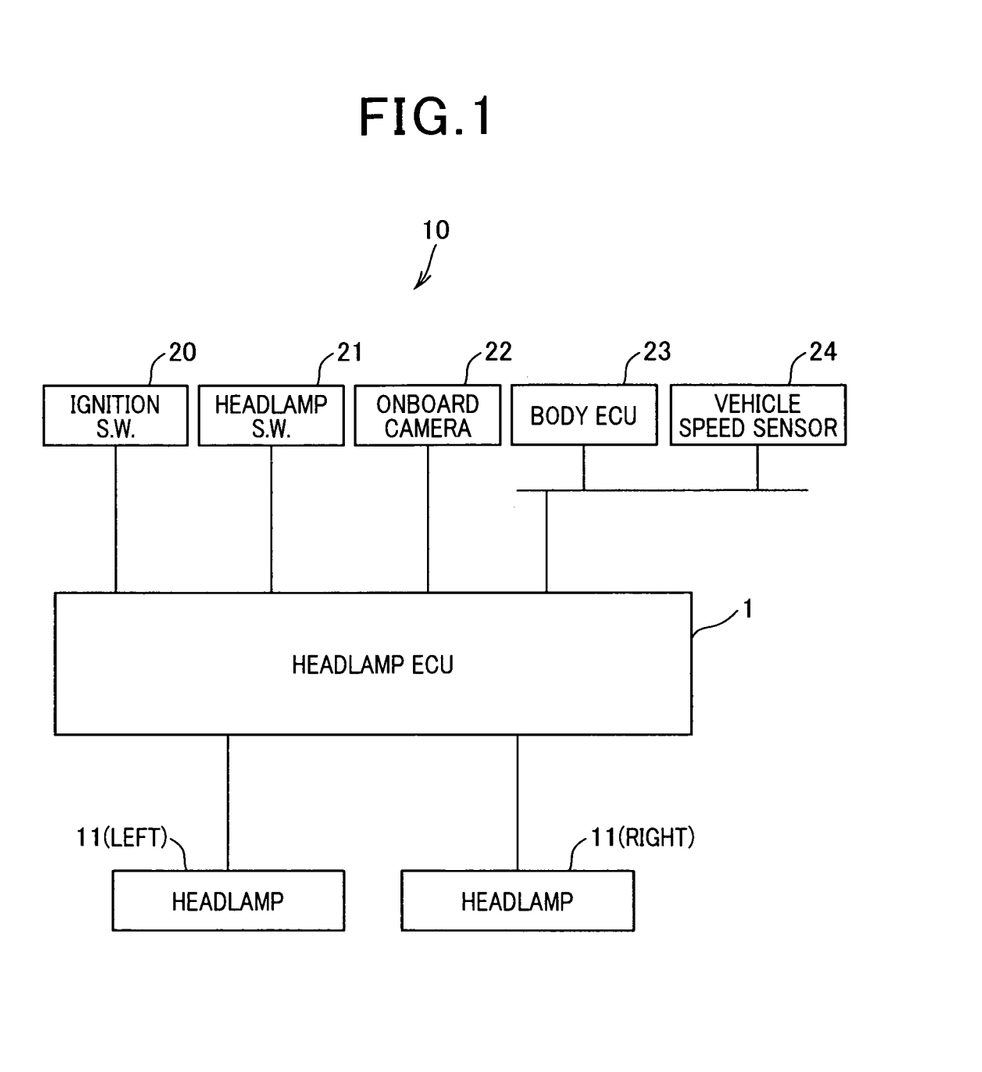
FIG. 1 is a block diagram which shows a structure of a lighting control system according to an embodiment.

Referring to the drawings, wherein like reference numbers refer to like parts in several views, particularly to FIG. 1, there is shown a lighting control system 10 which controls operations of headlamps 11 installed in, for example, an automotive vehicle to emit light outside a vehicle cabin. The lighting control system 10 of this embodiment may alternatively be used for any other type of illuminants such as tail lamps, fog lamps, or turn signal lamps instead of the headlamps 11. Usually, the headlamps are the highest in brightness of emitted light among illuminants mounted in automotive vehicles. Consequently, if any of lighting devices such as bulbs of the headlamps is broken in operation, the driver or other passengers in the vehicle (which will also be referred to as vehicle users blow) may not visually perceive such an event outside the vehicle due to glaring of light emitted from the other unbroken lighting devices. The lighting control system 10 is, therefore, very suitable for the headlamps of the automotive vehicles.

The lighting control system 10 includes a headlamp electronic control unit (ECU) 1, an ignition switch (IGSW) 20, a headlamp switch 21, an onboard camera 22, a body ECU 23, and a vehicle speed sensor 24.

The headlamp ECU 1 electrically communicates with the IGSW 20, the headlamp switch 21, and the onboard camera 22 through electrical wires and also with the body ECU 23 and the vehicle speed sensor 24 through an in-vehicle network. The headlamp ECU 1 also couples with the right and left headlamps 11 mounted on the right and left sides of the front of the vehicle through electric wires, as will be described later in detail. The lighting control system 10 is also equipped with a power supply circuit (not shown) which works to supply electric power, as provided by a storage battery mounted in the vehicle, to the components of the lighting control systems when the IGSW 20 is in an off-state. The IGSW 20 is illustrated as being connected directly to the headlamp ECU 1 through the electric wire, however, may alternatively be coupled with an engine ECU (not shown), so that an on/off signal is transmitted from the engine ECU to the headlamp ECU 1 through an in-vehicle network.

Figure 2:
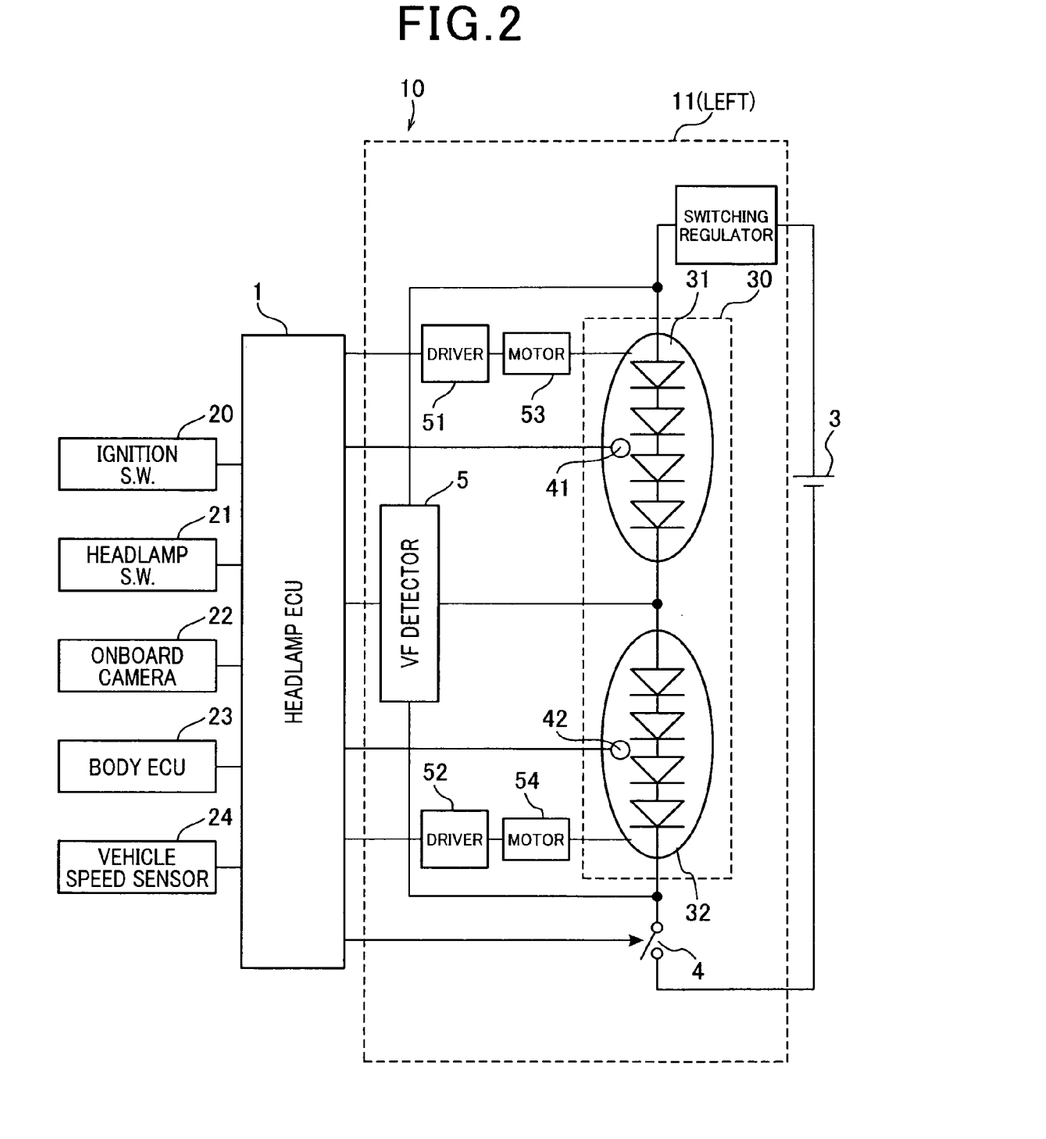
FIG. 2 is a block diagram which illustrates an internal structure of headlamps installed in the lighting control system of FIG. 1.

FIG. 2 illustrates an internal structure of the left headlamp 11 and connections of components of the left headlamp 11 to the headlamp ECU 1. The right and left headlamps 11 are identical in structure, operation, and connection to the headlamp ECU 1 with each other, and the following discussion will refer only to the left headlamp 11 for the brevity of disclosure. FIG. 2 omits the in-vehicle network of FIG. 1 for the sake of simplicity of illustration.

The headlamp 11 includes a switching regulator 2, a light source 30, electric motors 53 and 54, drivers 51 and 52, and a forward voltage detector 5. The light source 30 consists of multi-chip LED (Light-Emitting Diode) modules 31 and 32. The drivers 51 and 52 work to control operations of the motors 53 and 54 to move the LED modules 31 and 32 vertically or horizontally in a leveling mode or a swivel mode.

The headlamp ECU 1 communicates with the drivers 51 and 52 through electric wires. The drivers 51 and 52 connect with the motors 53 and 54 through electric wires. The motors 53 and 54 are coupled mechanically with the multi-chip LED modules 31 and 32 through gear sets to move them vertically or horizontally in the leveling or swivel mode.

The headlamp ECU 1 communicates with the switching regulator 2 through an electric wire. The switching regulator 2 also connects with a storage battery 3 mounted in the vehicle and the multi-chip LED modules 31 and 32 of the light source 30 through electric wires.

The headlamp ECU 1 also connects with the forward voltage (Vf) detector 5 through an electric wire.

The headlamp 11 also has photo-sensors 41 and 42 (also called photo-detectors) disposed in the vicinity of the multi-chip LED modules 31 and 32. The headlamp ECU 1 also connects with the photo-sensors 41 and 42 through electric wires.

The lighting control system 10 also includes a semiconductor switching device 4 disposed in an electric wire extending between the light source 30 and the battery 3. The headlamp ECU 1 connects with the semiconductor switching device 4 through an electric wire to switch the semiconductor switching device 4 between an on-state and an off-state.

The IGSW 20 is a switch which is turned on or off to start or stop an internal combustion engine or an electric motor mounted in the vehicle and outputs a signal indicating such an on-state or an off-state to the headlamp ECU 1.

The headlamp switch 21 is disposed near a steering wheel of the vehicle. When turned on by the vehicle driver, the headlamp switch 21 outputs an on-signal to the headlamp ECU 1 to activate the light source 30 of the headlamp 11 to emit a beam of light. When turned off by the vehicle driver, the headlamp switch 21 outputs an off-signal to the headlamp ECU 1 to deactivate the light source 30 of the headlamp 11 to stop emitting the beam of light.

The onboard camera 22 is implemented by, for example, an image sensor which is mounted in the cabin or on the hood of the vehicle and captures an image of a frontal view toward which the light is to be emitted from the headlamp 11. The vehicle in which the lighting control system 10 is installed will also be referred to below as a system vehicle. The onboard camera 22 is used to take an image of lamps of preceding vehicle or oncoming vehicles to detect the presence of such other vehicles in an analog form. The onboard camera 22 converts the analog image through a signal converter (not shown) installed therein into a digital form (which will also be referred to as an image data) and sends it to the headlamp ECU 1. Instead of the onboard camera 22, an inter-vehicle communication system (not shown) may be used to detect the presence of other vehicles and inform the ECU 1 of them through an in-vehicle network communication line. The onboard camera 22 may also be used to extract edges from a captured image which represents a person and output it to the headlamp ECU 1.

The body ECU 23 works to manage opening or closing of doors, locking or unlocking of the doors, and opening or closing of automatic windows of the system vehicle. For example, when the doors are manually opened, closed, unlocked, or locked through a keyless entry system, the body ECU 23 outputs a signal indicative of such an event to the headlamp ECU 1 through the in-vehicle network.

The vehicle speed sensor 24 works to measure the speed of a road wheel of the system vehicle and output a pulse signal indicative thereof to the headlamp ECU 1 through the in-vehicle network. Instead of the vehicle speed sensor 24, the speed of the vehicle may be determined by irradiating a millimeter radar wave onto the road surface and calculating an absolute speed of the system vehicle relative to the road surface:

The switching regulator 2 is engineered to regulate the electric current to be supplied to the light source 30 of the headlamp 11. Specifically, when receiving a lighting power control signal (i.e., an on-signal) from the headlamp ECU 1 which specifies the amount of current to be delivered to the light source 30 of the headlamp 11, the switching regulator 2 regulates the dc current, as supplied from the battery 3, to the specified amount and provide it to the multi-chip LED modules 31 and 32. When receiving a lighting-off signal from the headlamp ECU 1, the switching regulator 2 stops supplying the current to the light source 30 to turn off the multi-chip LED modules 31 and 32. The switching regulator 2 of this embodiment is so designed as to start or stop the supply of current to the multi-chip LED modules 31 and 32 immediately after receiving the on- or off-signal, as outputted from the headlamp ECU 1 in response to a driver's manual operation of the headlamp switch 21. For example, the switching regulator 2 starts to do such an operation a given period of time after receiving the on- or off-signal. The given period of time is, for example, one second in which the driver will not feel that the response of the light source 30 to the manual operation of the headlamp switch 21 is slow.

Figure 3:
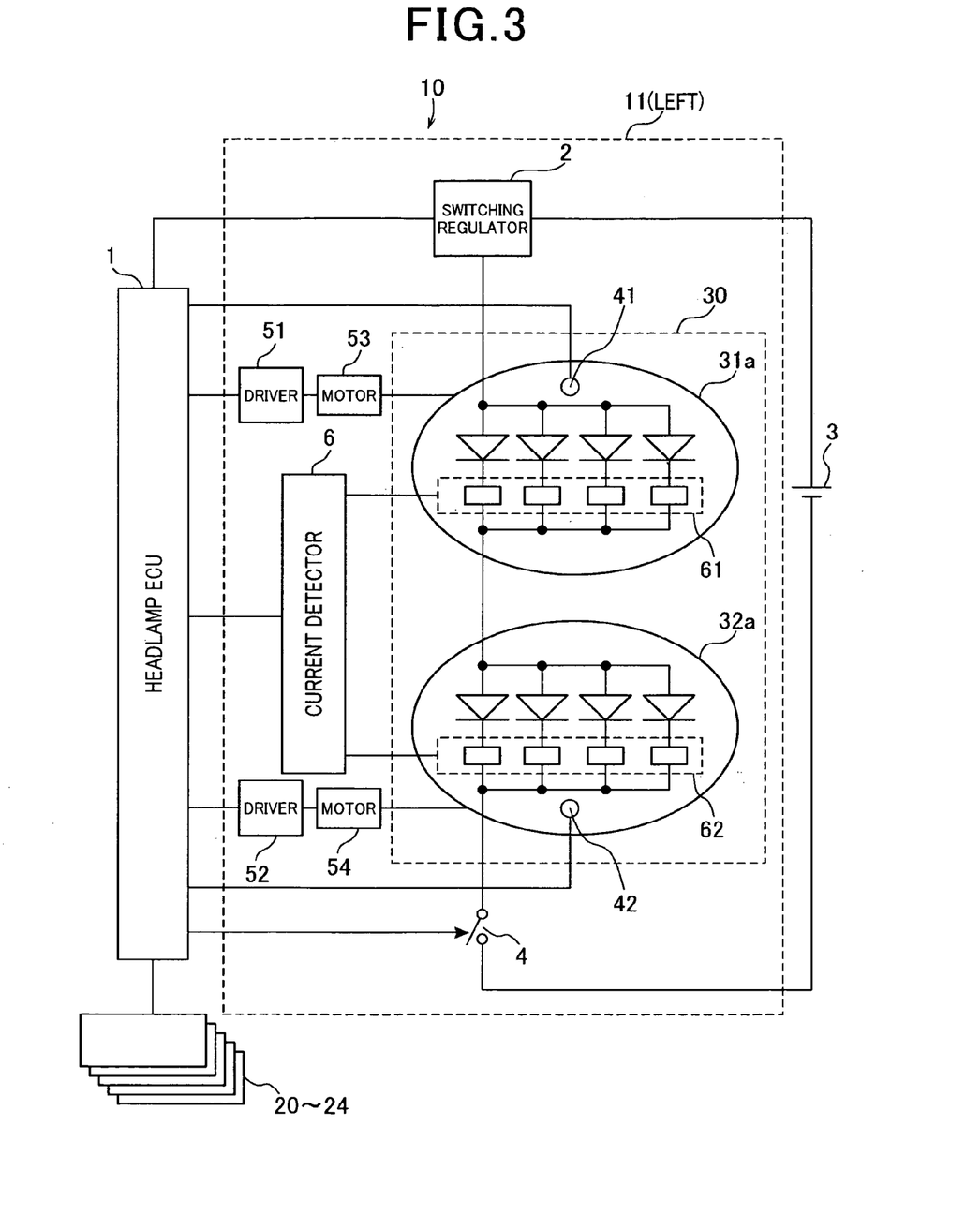
FIG. 3 is a block diagram which illustrates a modification of the headlamps of FIG. 2.

Each of the multi-chip LED modules 31 and 32 is made of a package in which a plurality of LED chips (four in this embodiment) are installed. The LED chips are connected in series to an output terminal of the switching regulator 2. In place of the two multi-chip LED modules 31 and 32, only one multi-chip LED module or three or more multi-chip LED modules may be used. Alternatively, a plurality of single chip LED modules each of which has only one LED chip disposed in a package may also be used. Each of the multi-chip LED modules 31 and 32 may be designed to have an structure, as illustrated in FIG. 3, in which the LED chips are connected in parallel.

The Vf detector 5 is connected in parallel to ends of each of the multi-chip LED modules 31 and 32 to measure voltage developed at the ends of each of the multi-chip LED modules 31 and 32 (i.e., a total forward voltage Vf of the four LED chips). The Vf detector 5 converts the measured forward voltages Vf through an A/D converter into digital forms, respectively, which will be referred to below as forward voltage Vf1 and Vf2, as appearing at the ends of the multi-chip LED modules 31 and 32, and outputs them to the headlamp ECU 1.

The photo-sensors 41 and 42 are disposed inside the light source 30 at locations where they correctly measure a total amount of luminescence of the four LED chips of the multi-chip LED modules 31 and 32, respectively. Each of the photo-sensors 41 and 42 measures the amount of luminescence of a corresponding one of the multi-chip LED modules 31 and 32 when the light source 30 is kept on and transmit it as a brightness data L1 or L2 to the headlamp ECU 1.

The headlamp ECU 1 is implemented by a typical microcomputer which consists essentially of a ROM in which lighting control programs are stored, a RAM in which data is stored temporarily, a nonvolatile memory which retains stored information even when not powered, and a CPU which performs the programs stored in the ROM. The lighting control system 10 also includes a communication interface for transmitting data to or accept data from an ECU which controls an operation of the system vehicle through the in-vehicle network, an interface circuit such as an I/O for establishing direct communication with the headlamp ECU 1 without use of the in-vehicle network, and a timer (or a counter) which measures time used to turn on the light source 30.

The ROM of the headlamp ECU 1 stores therein programs to process received signals, control the operations of the switching regulator 2 and the light source 30, and execute tasks when the light source 30 is found to be malfunctioning. The RAM stores results of operations performed by the CPU and data on the speed of the system vehicle or image data received through the interface circuit. The nonvolatile memory retains therein initial values of the forward voltages Vf1 and Vf2 used when the multi-chip LED modules 31 and 32 are initially mounted in the system vehicle, initial values of the brightness data L1 and L2, and data on a warning enabling condition(s) which is used to decide whether malfunction warning operations, as will be described later in detail, are permitted to be executed or not. The malfunction warning operations are to inform the vehicle users of a malfunction of the light source 30 when the system vehicle is running. The warning enabling condition may be determined in advance and stored in the nonvolatile memory when the system vehicle is shipped from a factory or inputted manually by the driver into the nonvolatile memory using an input device.

The headlamp ECU 1 receives the on or off signal from the IGSW 20 to determine whether the battery 3 is permitted to be charged or not.

The headlamp ECU 1 is responsive to the on- or off-signal outputted from the headlamp switch 21 to provide an on- or off-signal to the switching regulator 2 to activate or deactivate the light source 30. The headlamp ECU 1 also transmits to the switching regulator 2 data on control of the amount of current to be supplied to the light source 30.

The headlamp ECU 1 receives the image data from the onboard camera 22 to extract pairs of headlights from it and determines whether a preceding vehicle or an oncoming vehicle is present in front of the system vehicle or not. The headlamp ECU 1 may also extract edges from the image data to determine whether a pedestrian is present or not.

The headlamp ECU 1 receives from the body ECU 23 information which indicates whether the doors of the system vehicle are open or closed and determines that the doors are now open or closed (i.e., the status of the system vehicle). When the doors are determined to be open, the headlamp ECU 1 determines the vehicle driver is getting on or off the system vehicle. Such a determination may alternatively be made when the doors are found to be unlocked or when the IGSW 20 is found to be turned off.

The headlamp ECU 1 monitors an output of the vehicle speed sensor 24 at all times and determines whether the system vehicle is now running or stopped (i.e., the status of the system vehicle). Such a determination may alternatively be made based on data on the position of a shift lever of an automatic transmission (i.e., a gear position), as derived from a brake ECU (not shown) through the in-vehicle network. When the shift lever is found to be in the park position, the headlamp ECU 1 decides that the system vehicle is not running.

The headlamp ECU 1 works as a headlamp diagnosis circuit. Specifically, the headlamp ECU 1 samples the forward voltage Vf1 of the multi-chip LED module 31 and the forward voltage Vf2 of the multi-chip LED module 32 cyclically through the Vf detector 5 when a constant current is flowing through the light source 30, so that the light source 30 is kept on. The headlamp ECU 1 then compares the sampled values of the forward voltages Vf1 and Vf2 with the initial values, as stored in the RAM, to diagnose whether the multi-chip LED modules 31 and 32 are malfunctioning or not. An example of such a diagnosis operation using the forward voltage of the light source 30 is taught in Japanese Patent First Publication No. 02-015597, the disclosure of which is incorporated herein by reference.

The diagnosis of whether the multi-chip LED modules 31 and 32 are malfunctioning or not may alternatively be made by comparing values of the luminance or brightness of the multi-chip LED modules 31 and 32, as derived cyclically by the photo-sensors 41 and 42, with initial values thereof. For example, when the initial value minus the value of brightness of the multi-chip LED module 31 is greater than a given value (e.g., an initial value of brightness of each of the LED chips of the multi-chip LED module 31), meaning that the luminance of the one LED chip has been lost, the headlamp ECU 1 decides that the light source 30 is malfunctioning or may alternatively decide that the multi-chip LED module 31 is malfunctioning.

The headlamp ECU 1 also outputs an on- or off-signal to the semiconductor switching device 4. The semiconductor switching device 4 is normally kept on by the headlamp ECU 1, but turned on and off cyclically to flash the light source 30 at an interval of, for example, two sec. when a given condition is encountered during the control operation of the headlamp ECU 1. The semiconductor switching device 4 may be implemented by a MOS transistor or a bipolar transistor.

The headlamp ECU 1 outputs a leveling or a swivel signal to the motors 53 and 54 through the drivers 51 and 52 to move the multi-chip LED modules 31 and 23 (i.e., the headlamp 11) vertically or horizontally in the leveling or swivel mode.

For example, when an optical axis of the right or left headlamp 11 is shifted vertically when the body of the system vehicle is inclined due to getting of the driver, the passenger, or the baggage in or out of the system vehicle, the headlamp ECU 1 automatically levels the right or left headlamp 11 in the leveling mode. When the system vehicle has started to turn or go around a curve, the headlamp ECU 1 automatically swivels the optical axis of the right and/or left headlamp 11 to a direction in which the system vehicle is heading in order to give the driver a wide range of visibility.

FIG. 3 illustrates a modification of the structure of the light source 30. Specifically, the light source 30 is equipped with multi-chip LED modules 31a and 32a. Each of the multi-chip LED modules 31a and 32a has LED chips connected in parallel to each other. The headlamp ECU 1 works to monitor the value of electric current flowing through each of the LED chips to diagnose it. The diagnosis of the multi-chip LED modules 31a and 32a will be described below in detail.

The headlamp ECU 1 is connected to a current detector 6 through an electric wire. The multi-chip LED modules 31a and 32a are equipped with current sensors 61 and 62, respectively. Each of the current sensors 61 and 62 is made up of four current sensing devices, one for each of the LED chips.

The current detector 6 is joined electrically to each of the current sensing devices disposed at cathodes of the LED chips within each of the multi-chip LED modules 31a and 32a. Each of the current sensing devices works to measure an electric current flowing through a corresponding one of the LED chips.

The current detector 6 samples an output from each of the current sensing devices of the current sensors 61 and 62 which indicates a value of current flowing through one of the LED chips and converts it into a digital form. The current detector 6 transmits such a digital current value to the headlamp ECU 1.

The headlamp ECU 1 works as a headlamp diagnosis circuit to sample the digital current value, as derived by the current detector 6, cyclically when a constant current is flowing through the light source 30, so that the light source 30 is kept on. The headlamp ECU 1 then compares the sampled digital current value with an initial value, as stored in the RAM, to diagnose whether a corresponding one of the multi-chip LED modules 31 and 32 is malfunctioning or not. An example of such a diagnosis operation using the value of current flowing through each of the LED chips of the multi-chip LED modules 31a and 32a is taught in Japanese Patent First Publication No. 2006-103477, the disclosure of which is incorporated herein by reference. The headlamp ECU 1 of FIG. 3 may be designed to diagnose the multi-chip LED modules 31a and 32a using the outputs of the photo-sensors 41 and 42 in the same manner, as described in FIG. 2.

The structure of FIG. 3 in which the LED chips of the multi-chip LED modules 31a and 32a are connected in parallel enables properly operating ones of the LED chips to be lightened even if any of the LED chips of the multi-chip LED modules 31a and 32a becomes defective due to a wire disconnection as well as an electric short or electric leakage in the light source 30.

The above operations of the headlamp ECU 1 of the lighting control system 10 to be executed when the headlamp switch 21 is turned on will be described in detail with reference to FIGS. 4 to 7.

Figure 4:
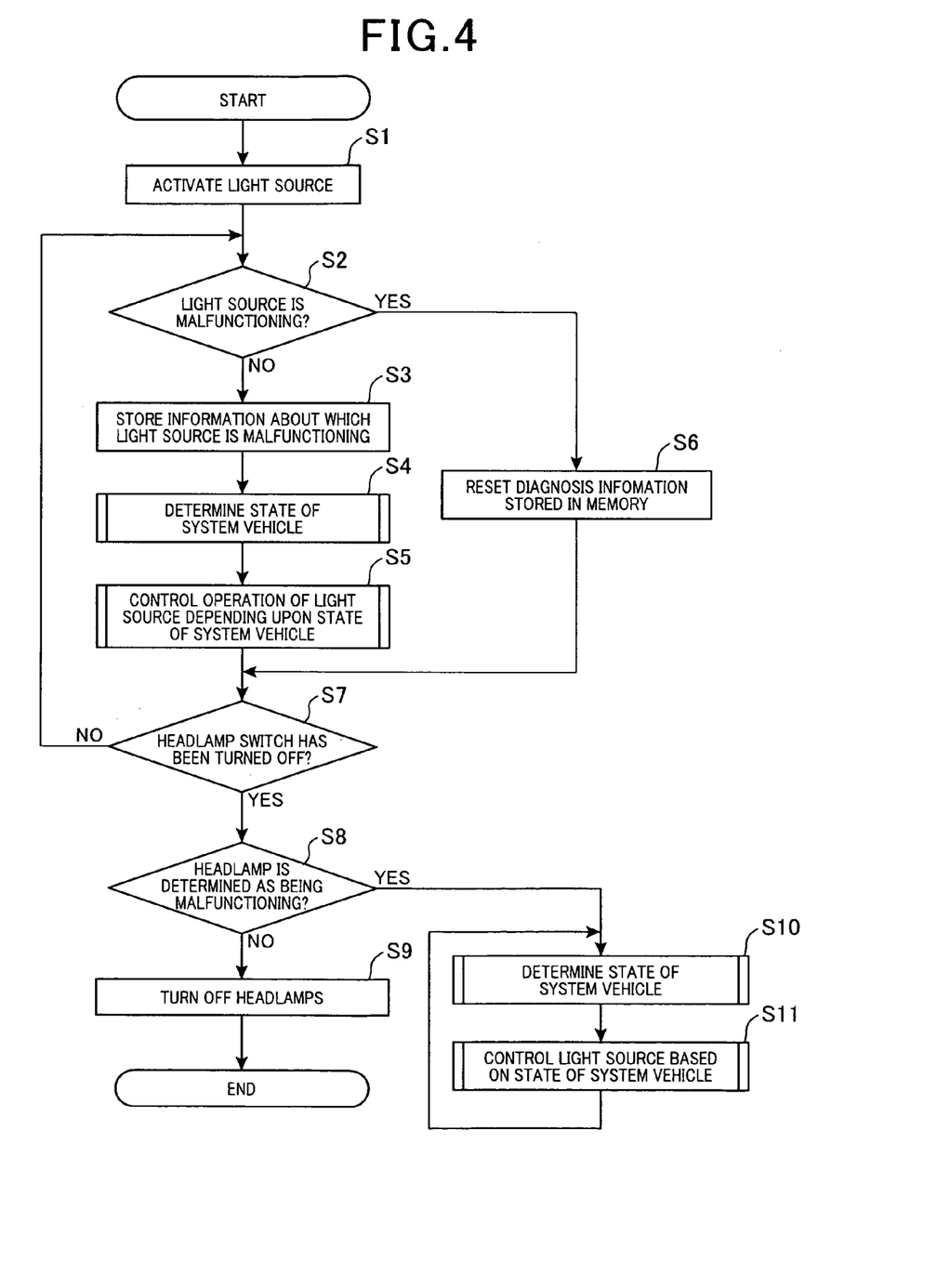
FIG. 4 is a flowchart of a man program to be executed by the lighting control system of FIG. 1 to diagnose headlamps and warn about a malfunction of the headlamps.

FIG. 4 illustrates a flowchart of a main sequence of logical steps or program to be executed by the headlamp ECU 1 in the diagnosis/warning mode.

Upon turning on of the headlamp switch 21 made by the vehicle user, the routine proceeds to step S1 wherein the light source 30 of each of the headlamps 11 is activate to light the multi-chip LED modules 31 and 32.

The routine proceeds to step S2 wherein it is determined whether the light source 30 of each of the headlamps 11 is malfunctioning or not based on the forward voltages Vf of the multi-chip LED modules 31 and 32, the current flowing through each of the LED chip, or the luminance of each of the multi-chip LED modules 31 and 32 in the manner, as described above. If a NO answer obtained meaning that the headlamp 11 is operating properly, then the routine proceeds to step S6. Alternatively, if a NO answer is obtained, then the routine proceeds to step S3 wherein information about which of the right and left headlamps 11 is malfunctioning is stored in the RAM. In the following discussion, it is assumed that information indicating that the multi-chip LED module 31 of the left headlamp 11 is defective is stored in the RAM.

The routine proceeds to step S4 wherein the status of the system vehicle is analyzed. Specifically, the system vehicle is determined to be in the state where (1) the system vehicle is now running, (2) the system vehicle is stopped, or (3) the vehicle user is now getting in or out of the system vehicle. The operation in step S4 will be described later in detail with reference to FIG. 5.

The routine proceeds to step S5 wherein the lighting of the left headlamp 11 which has been determined to be malfunctioning is controlled in one of warning lighting modes selected based on the status of the system vehicle, as determined in step S4. The operation in step S5 will be described later in detail with reference to FIG. 6.

If a NO answer is obtained in step S2 meaning that the headlamps 11 are operating properly, then the routine proceeds to step S6 wherein the information, as stored in the RAM in step S3 in a previous cycle of this program, which indicates that the left headlamp 11 is malfunctioning is erased in order to eliminate an error in providing erroneous diagnosis information after the malfunctioning left headlamp 11 is replaced with a new one.

After step S5 or S6, the routine proceeds to step S7 wherein it is determined whether the headlamp switch 21 has been turned off or not. If a NO answer is obtained meaning that the headlamp switch 21 is still kept on, the routine returns back to step S2. Alternatively, if a YES answer is obtained, then the routine proceeds to step S8 wherein it is determined whether either of the headlamps 11 is determined as being malfunctioning or not. If a NO answer is obtained meaning that there is no headlamps 11 which is determined as being malfunctioning, then the routine proceeds to step S9. Alternatively, if a YES answer is obtained, then the routine proceeds to step S10.

In step S9, the right and left headlamps 11 are turned off immediately in response to the off request, as derived in step S7. The routine then terminates.

In step S10, the same operation as in step S4 is executed which will be described later in detail with reference to FIG. 5.

After step S10, the routine proceeds to step S11 wherein the left headlamp 11 which is determined as being malfunctioning is turned off in one of the lighting off modes selected based on the state of the system vehicle, as derived in step S10. The operation in step S11 will be described later in detail with reference to FIG. 7. After step S11, the routine repeats a sequence of steps S10 and S11 until the headlamp switch 21 is turned on. Alternatively, after step S11, the routine terminates.

Figure 5:
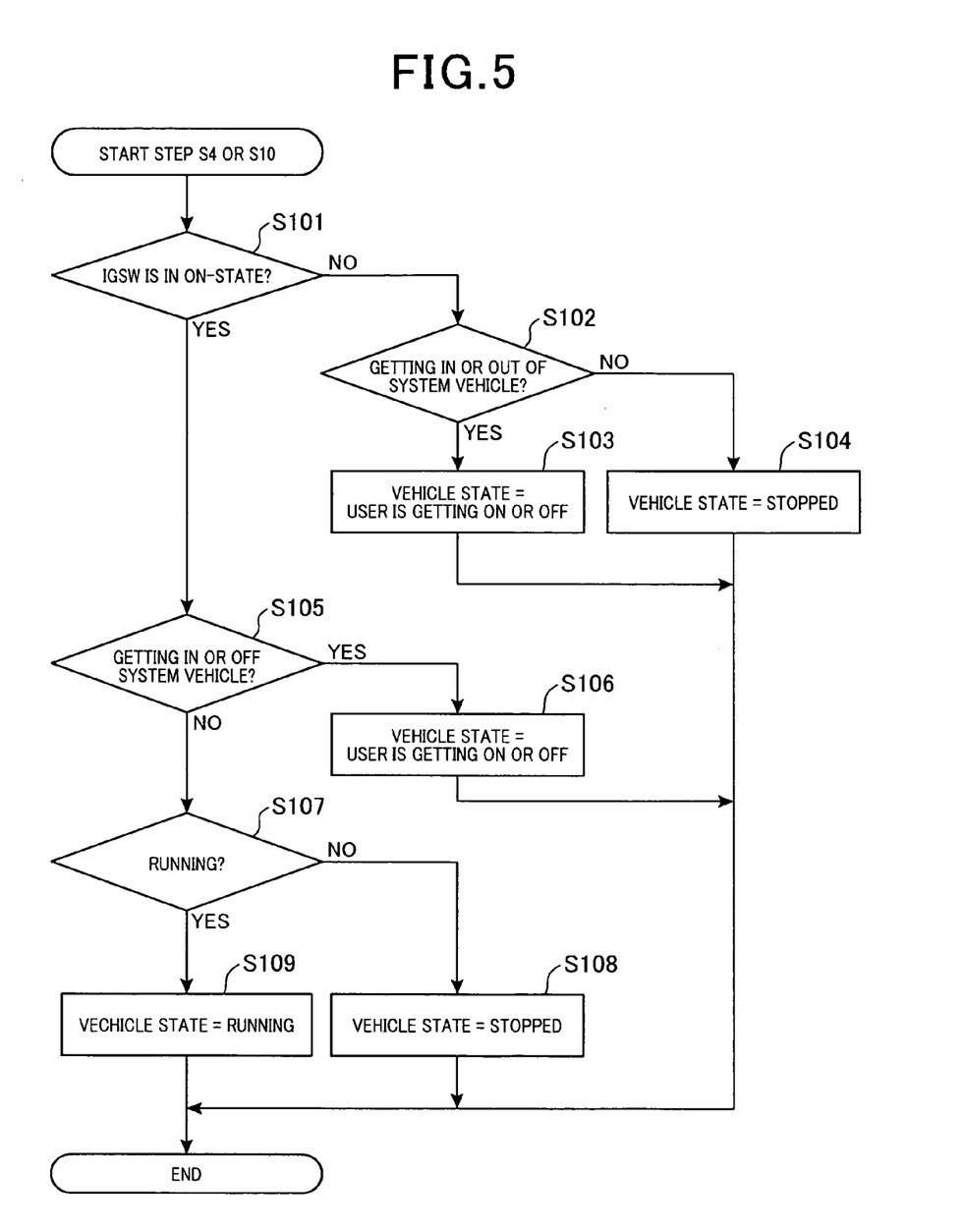
FIGS. 5, 6, and 7 are flowcharts of sub-programs to be executed in the main program of FIG. 4.

FIG. 5 is a flowchart of a sub-program to be executed in step S4 or S10.

First, in step S101, it is determined whether the IGSW 20 is in the on-state or not. If a NO answer is obtained, then the routine proceeds to step S102. Alternatively, if a YES answer is obtained, then the routine proceeds to step S105. The determination in step S101 is made to know whether the battery 3 has been enabled to be charged by, for example, an alternator (not shown) after the IGSW 20 is turned on. In the case where the system vehicle is an electric vehicle which is not equipped with a charging feature to charge the battery 3 and needs to charge the battery 3 using an external device, steps S101 to S104 may be omitted.

In step S102, it is determined whether the vehicle user is now getting in or out of the system vehicle or not. For example, it is determined whether the door of the system vehicle is open or not. If a YES answer is obtained meaning that the vehicle user is getting in or out of the system vehicle, then the routine proceeds to step S103 wherein the state of the system vehicle is determined to indicate that the vehicle user is getting in or out of the system vehicle, and the IGSW 20 is in the off-state. The routine then terminates. Alternatively, if a NO answer is obtained in step S102, then the routine proceeds to step S104 wherein the state of the system vehicle is determined to indicate that the system vehicle is at rest, and the IGSW 20 is in the off-state. The routine then terminates.

If a YES answer is obtained in step S101 meaning that the IGSW 20 is in the on-state, then the routine proceeds to step S105 wherein it is determined, like in step S102, whether the vehicle user is now getting in or out of the system vehicle or not. If a YES answer is obtained, then the routine proceeds to step S106 wherein the state of the system vehicle is determined to indicate that the vehicle user is getting in or out of the system vehicle, and the IGSW 20 is in the on-state. The routine then terminates. Alternatively, if a NO answer is obtained in step S105, then the routine proceeds to step S107.

In step S107, it is determined whether the system vehicle is now running or not based on the speed of the system vehicle, as measured by the vehicle speed sensor 24, or the sampled position of the shift lever of the system vehicle. If a NO answer is obtained meaning that the system vehicle is not running, then the routine proceeds to step S108 wherein the state of the system vehicle is determined to indicate that the system vehicle is stopped, and the IGSW 20 is in the on-state. The routine then terminates. Alternatively, if a YES answer is obtained in step S107, then the routine proceeds to step S109 wherein the state of the system vehicle is determined to indicate that the system vehicle is now running, and the IGSW 20 is in the on-state. The routine then terminates.

As apparent from the above discussion, the facts that the IGSW 20 is in the on-state or the off-state and that the vehicle user is getting in or out of the system vehicle are also used as state parameters to specify the states of the system vehicle in addition to the state parameters indicating that the system vehicle is running and that the system vehicle is stopped. Additionally, a change in environmental condition which enables the user to look straight at the headlamps 11 may be used as one of the state parameters. For instance, times the sun will rise or set on the day is compared with the current time through a clock device (not shown) to determine whether it is during the daytime or nighttime. The headlamp ECU 1 obtains such a determination through the in-vehicle network and uses it as one of the state parameters (which indicates, for example, whether traffic regulations are met or not).

The use of the above state parameters representing the state of the system vehicle enables a plurality of conditions where the user will visually perceive the headlamps 11 to be specified. This permits the headlamps 11 to be activated selectively in a plurality of different warning lighting modes depending upon the state of the system vehicle, thereby increasing the possibility that the user would visually perceive the fact that the headlamp(s) 11 is now malfunctioning.

Figure 6:
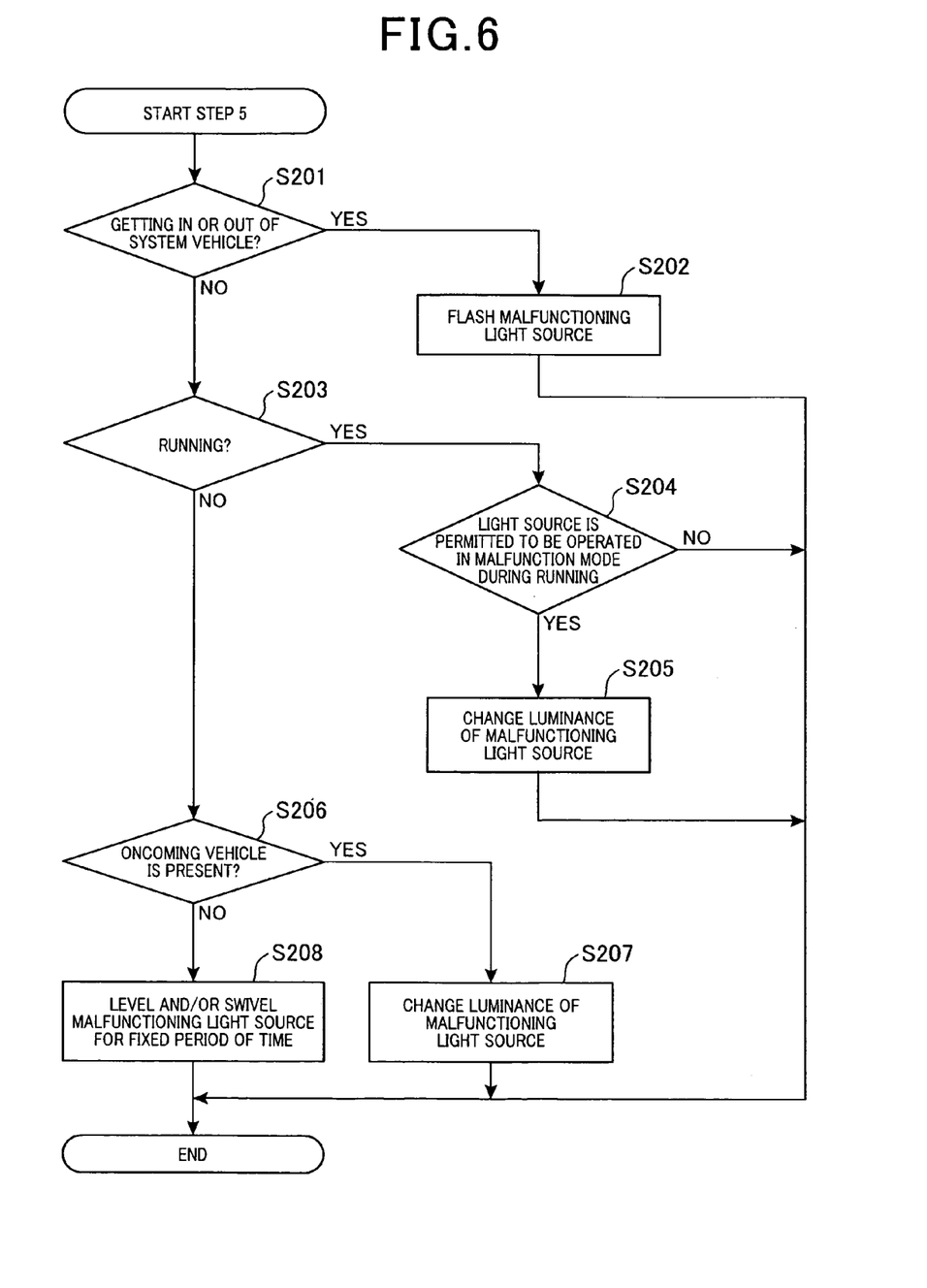

FIG. 6 is a flowchart of a sub-program to be executed in step S5 to control the operation of the headlamp 11 in a selected one of the warning lighting modes.

First, in step S201, it is determined whether the vehicle user is now getting in or out of the system vehicle or not. If a YES answer is obtained, then the routine proceeds to step S202. Alternatively, if a NO answer is obtained, then the routine proceeds to step S203.

In step S202, one of the light sources 30 which has been determined to be malfunctioning (i.e., the light source 30 of the left headlamp 11) is flashed repeatedly for a given period of time. After elapse of such a time, the left headlamp 11 is returned to the normal lighting mode, that is, continues to be turned on. The routine then terminates. The flashing duration for which the left headlamp 11 is flashed cyclically is set to, for example, sixty (60) seconds when the IGSW 20 is in the on-state or thirty (30) seconds when the IGSW 20 is in the off-state. This is because a person usually spends several tens of seconds to several minutes to get in or out of an automotive vehicle. The reason why the flashing duration when the IGSW 20 is in the off-state is shorter than that when the IGSW 20 is in the on-state is to minimize an undesirable consumption of power from the battery 3 because when the IGSW 20 is in the off-state, the battery 3 will not be charged.

The flashing of the malfunctioning left lamp 11 in the above manner captures the attention of the vehicle user outside the system vehicle before the vehicle user gets on the system vehicle or after the user gets off the system vehicle, so that the vehicle user visually perceives the fact that the left headlamp 11 is malfunctioning.

If a NO answer is obtained in step 201 meaning that the vehicle user is not getting in or out of the system vehicle, then the routine proceeds to step 203 wherein it is determined whether the system vehicle is running or not. If a YES answer is obtained meaning that the system vehicle is now running, then the routine proceeds to step S204. Alternatively, if a NO answer is obtained, then the routine proceeds to step S206.

In step S204, it is determined whether the malfunctioning left headlamp 11 is permitted to be placed in one of the warning lighting modes or not based on the warning enabling condition for the malfunction warning operations, as described above. If the warning enabling condition is met, that, is, the lighting control system 10 is permitted to warn about the malfunction of the left headlamp 11, then the routine proceeds to step S205 wherein the luminance of the malfunctioning light source 30 is changed for a given period of time. The routine then terminates. Specifically, the headlamp ECU 1 controls the switching regulator 2 to decrease the amount of current to be supplied to one of the light sources 30 which is determined to be malfunctioning (i.e., the light source 30 of the left headlamp 11) to, for example, half a normal amount of the current.

Specifically, the malfunctioning left headlamp 11 is dimmed while the system vehicle is running, thereby attracting the attention of the vehicle user inside the system vehicle, so that the vehicle user visually perceives the fact that the left headlamp 11 is malfunctioning. The duration for which the malfunctioning left headlamp 11 is dimmed is set to, for example, thirty (30) seconds. After elapse such a time, the headlamp ECU 1 returns the luminance of the left headlamp 11 to the usual level. This also draws the vehicle user's attention to the left headlamp 11, thus resulting in an increase in possibility that the user visually perceive the malfunction of the left headlamp 11. The headlamp ECU 1 may decrease the current flowing through the left headlamp 11 slowly (e.g., for ten seconds) to return the luminance of the left headlamp 11 to the usual level. As apparent from the above discussion, when the system vehicle is running, and the left headlamp 11 is found to be malfunctioning, the headlamp ECU 1 changes the brightness of the left headlamp 11 slowly to inform the vehicle user of the malfunction of the left headlamp 11 without lowering the driver's frontal visibility and impairing the driver's performance.

If a NO answer is obtained in step S204, the left headlamp 11 is not changed in luminance thereof. Specifically, when the left headlamp 11 is found to be malfunctioning while the system vehicle is running, but it is determined that the malfunction warning operation on the left headlamp 11 would reduce the frontal visibility of the driver, the headlamp ECU 1 continues to light the left headlamp 11 without dimming it.

If a NO answer is obtained in step S203 meaning that the system vehicle is not running, that is, it is at rest, then the routine proceeds to step S206 wherein it is determined whether an oncoming vehicle which is usually considered to have a high possibility that the driver of the oncoming vehicle looks straight at the headlamps 11 of the system vehicle is present or not. If a YES answer is obtained, then the routine proceeds to step S207. Alternatively, if a NO answer is obtained, then the routine proceeds to step S208. Step S206 may alternatively be made to determine whether a preceding vehicle traveling ahead of the system vehicle is present or not or whether a pedestrian is present or not within an area illuminated by the headlamps 11.

In step S207, the headlamp ECU 1, like in step S205, decreases the luminance of the malfunctioning light source 30 for a given period of time. After elapse of such a time, the headlamp ECU 1 returns the luminance of the malfunctioning light source 30 to the usual level. The routine then terminates. A period of time for which the driver is stopping or parking the system vehicle depends upon the situation where the driver stops at a red light or parks by the side of the road. The duration for which the malfunctioning left headlamp 11 is dimmed may be changed depending upon such a situation, however, is set in this embodiment to thirty (30) seconds when the IGSW 20 is in the on-state or ten (10) seconds when the IGSW 20 is in the off-state.

Consequently, when the system vehicle is stopped, and the left headlamp 11 is found to be malfunctioning, the headlamp ECU 1 changes the brightness of the left headlamp 11 to inform the vehicle user of the malfunction of the left headlamp 11.

If a NO answer is obtained in step S206 meaning that the oncoming vehicle is not present, then the routine proceeds to step S208 wherein the light source 30 (i.e., the multi-chip LED modules 31 and 32) which has been determined as being malfunctioning, is leveled and/or swiveled for a given period of time while being lighted. The light source 30 is then lighted in the normal mode. The routine terminates. The swinging of the light source 30 (i.e., the left headlamp 11) in the vertical and/or lateral direction will make the vehicle user in the stopped system vehicle aware that the left headlamp 11 is malfunctioning. A great change in direction in which a beam of light is emitted by the left headlamp 11 will also result in vehicle user's quick notice of the malfunctioning. The leveling and/or swiveling of the malfunctioning headlamp 11 may alternatively be made while being flashed repeatedly.

The leveling or swiveling of the lighted headlamp 11 when there is an oncoming vehicle may cause the light to be cast into the eyes of a driver of the oncoming vehicle, thus producing glare to dazzle the driver. Therefore, if a YES answer is obtained in step S206 meaning that there is the oncoming vehicle, then the routine proceeds to step S207 wherein the luminance of the malfunctioning light source 30 is changed to warn the user of the system vehicle of the malfunctioning of the light source 30 without dazzling the oncoming driver.

Figure 7:
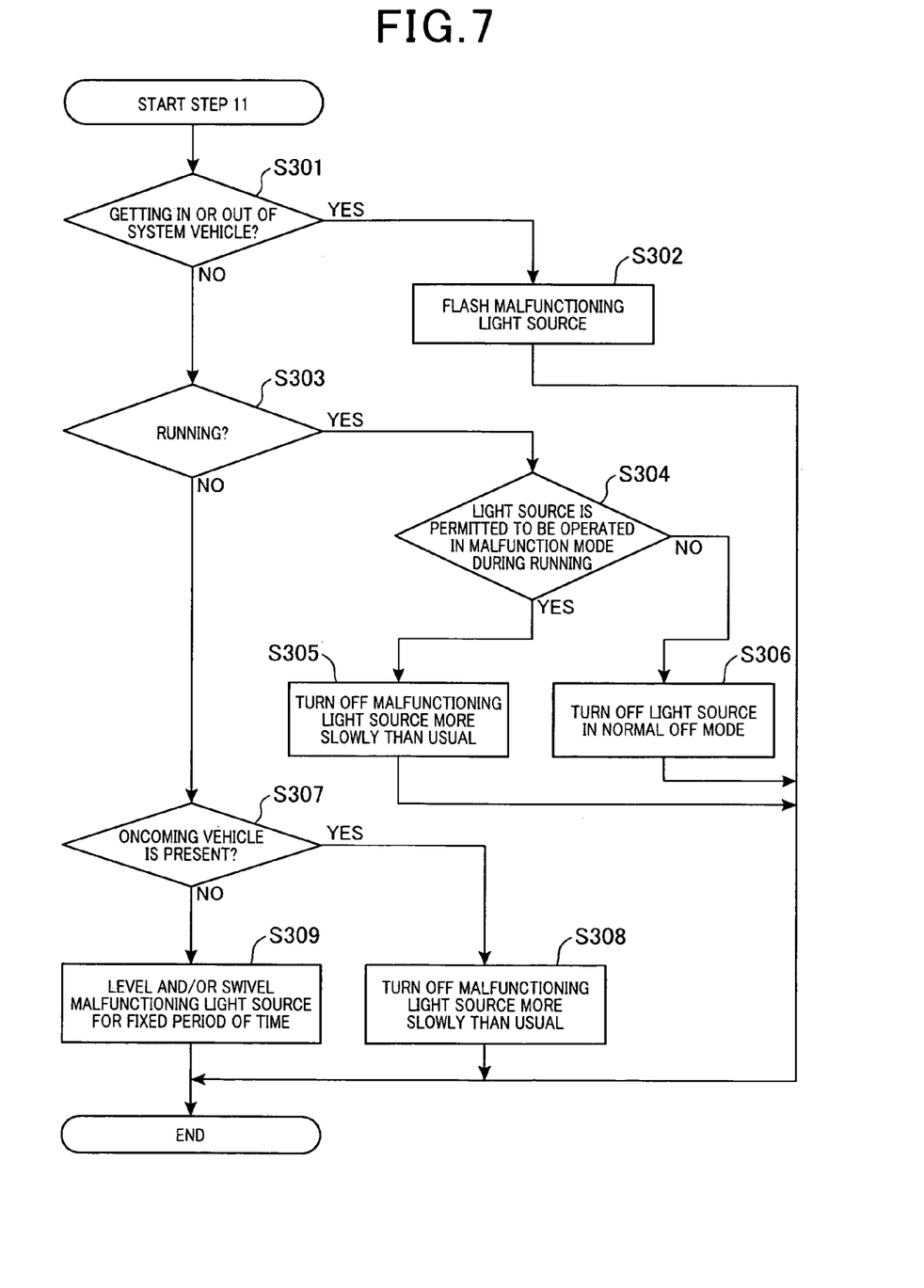

FIG. 7 is a flowchart of a sub-program to be executed in step S11 to control a turning off operation of the malfunctioning headlamp 11 in a selected one of the warning lighting modes based on the state of the system vehicle, as derived in step S10.

First, in step S301, it is determined whether the user is now getting in or out of the system vehicle or not. If a YES answer is obtained, then the routine proceeds to step S302. Alternatively, if a NO answer is obtained, then the routine proceeds to step S303.

In step S302, one of the light sources 30 which has been determined to be malfunctioning (e.g., the light source 30 of the left headlamp 11) is flashed cyclically for a given period of time. After elapse of such a time, the left headlamp 11 is returned to the normal off mode, that is, permitted to be turned off immediately in response to the turning off of the headlamp switch 21. The routine then terminates. The flashing duration for which the left headlamp 11 continues to be flashed repeatedly is set to, for example, sixty (60) seconds when the IGSW 20 is in the on-state or thirty (30) seconds when the IGSW 20 is in the off-state. This is because a person usually spends several tens of seconds to several minutes to get in or out of an automotive vehicle. The reason why the flashing duration when the IGSW 20 is in the off-state is shorter than that when the IGSW 20 is in the on-state is to minimize an undesirable consumption of power from the battery 3 because when the IGSW 20 is in the off-state, the battery 3 will not be charged.

The flashing of the malfunctioning left lamp 11 in the above manner captures the attention of the user outside the system vehicle before the user gets on the system vehicle or after the user gets off the system vehicle, so that the user visually perceives the fact that the left headlamp 11 is malfunctioning.

If a NO answer is obtained in step 301, meaning that the vehicle user is not getting in or out of the system vehicle, then the routine proceeds to step 303 wherein it is determined whether the system vehicle is running or not. If a YES answer is obtained meaning that the system vehicle is now running, then the routine proceeds to step S304. Alternatively, if a NO answer is obtained, then the routine proceeds to step S307.

In step S304, it is determined whether the malfunctioning left headlamp 11 is permitted to be placed in one of the warning lighting modes or not based on the warning enabling condition for the malfunction warning operations, as described above. If the warning enabling condition is met, that, is, the lighting control system 10 is permitted to warn about the malfunction of the left headlamp 11, then the routine proceeds to step S305. Alternatively, if a NO answer is obtained meaning that the warning enabling condition is not met, then the routine proceeds to step S306.

In step S305, the malfunctioning light source 30 (i.e., the left headlamp 11) is turned off at a rate slower than that in the normal turning off mode. Specifically, the headlamp ECU 1 instructs the switching regulator 2 to decrease the amount of current to be supplied to the left headlamp 11 to zero slowly over a preselected period of time (e.g. 10 sec.). This captures the attention of the user of the system vehicle and warns the user of the malfunction of the left headlamp 11. After step S305, the routine terminates.

If a NO answer is obtained in step S304 meaning that the warning enabling condition is not met, then the routine proceeds to step S306 wherein the headlamps 11 are turned off in the normal turning off mode. After step S306, the routine terminates.

The operation in step S305 or S306 is performed when the headlamps 11 are in the on-state. When this execution cycle of the sub-program of FIG. 7 is the second cycle or later, the headlamps 11 are already turned off. The headlamp ECU 1 then does not do anything.

If a NO answer is obtained in step S303 meaning that the system vehicle is not running, then the routine proceeds to step S307 wherein it is determined whether an oncoming vehicle is present or not. If a YES answer is obtained, then the routine proceeds to step S308. Alternatively, if a NO answer is obtained, then the routine proceeds to step S309. Step S307 may alternatively be made to determine whether a preceding vehicle traveling ahead of the system vehicle is present or not or whether a pedestrian is present or not within an area illuminated by the headlamps 11.

In step S308, the malfunctioning light source 30 (i.e., the left headlamp 11) is, like in step S305, turned off at a rate slower than that in the normal turning off mode. When the headlamps 11 are already turned off, the headlamp ECU 1 does not do anything, however, it may turn on the headlamp(s) 11 again and then turn off the malfunctioning light source slowly. After step S308, the routine terminates. A period of time for which the driver is stopping or parking the system vehicle depends upon the situation where the driver stops at a red light or parks by the side of the road. The duration for which the malfunctioning left headlamp 11 is dimmed depending upon such a situation, however, is set in this embodiment to thirty (30) seconds when the IGSW 20 is in the on-state or ten (10) seconds when the IGSW 20 is in the off-state.

Consequently, when the system vehicle is stopped, and the left headlamp 11 is found to be malfunctioning, the headlamp ECU 1 dims the left headlamp 11 slowly and then turns it off, thereby informing the user in the stopped system vehicle of the malfunction of the left headlamp 11.

If a NO answer is obtained in step S307 meaning that the oncoming vehicle is not present, then the routine proceeds to step S309 wherein the light source 30, as having been determined as being malfunctioning, is leveled and/or swiveled for a given period of time while being lighted. The light source 30 is then turned off in the normal turning off mode. The routine terminates. The swinging of the light source 30 (i.e., the left headlamp 11) in the vertical and/or lateral direction will make the user in the stopped system vehicle aware that the left headlamp 11 is malfunctioning. A great change in direction in which a beam of light is emitted by the left headlamp 11 will also result in vehicle user's quick notice of the malfunctioning. The leveling and/or swiveling of the malfunctioning headlamp 11 may alternatively be made while being flashed cyclically.

The leveling or swiveling of the lighted headlamp 11 when there is an oncoming vehicle may cause the light to be cast into the eyes of a driver of the oncoming vehicle, thus producing glare to dazzle the driver. Therefore, if a YES answer is obtained in step S307 meaning that there is the oncoming vehicle, then the routine proceeds to step S308 wherein the malfunctioning light source 30 (i.e., the left headlamp 11) is turned off at a rate slower than that in the normal turning off mode. After step S309 or S308, the routine terminates.

As apparent from the above discussion, the lighting control system 10 works as a diagnosis circuit, a vehicle state determining circuit and a malfunction warning circuit to diagnose the headlamps 11 and perform one of warning operations, as selected based on the state of the vehicle, when either of the headlamps 11 is found to be malfunctioning. For example, any of the LED chips of the multi-chip LED module 32 of the left headlamp 11 is found to be defective, the headlamp ECU 1 controls the on-state operation or the turning off operation of the malfunctioning left headlamp 11 or changes the orientation of a beam of light emitted from the malfunctioning left headlamp 11 in one of the warning lighting modes which is selected based on the running condition of the system vehicle or whether the user is viewed to be now getting in or out of the system vehicle. Generally, automotive exterior illuminant devices such as headlamps supporting the visibility of the driver when the vehicle is running, tail lamps, or hazard indicators which emit light outside the vehicle need to be replaced as soon as possible when they are found to be defective. The lighting control system 10 of this embodiment is designed to diagnose the illuminant devices and inform the user of the system vehicle visually of which of the illuminant devices is malfunctioning, thus permitting the user to replace or fix the malfunctioning illuminant device quickly.

The lighting control system 10 may also be equipped with an audio system and/or a display system which is disposed near the driver's seat to acoustically or visually inform the driver of the malfunction of the illuminant devices (i.e., the headlamps 11).

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, the headlamp switch 21 may be equipped with a mode selector which is connected electrically to the headlamp ECU 1 and operated manually by the driver to select between the diagnosis/warning mode in which the program of FIG. 4 is to be executed and the normal lighting mode in which the headlamps 11 are to be turned on or off immediately in response to the on- or off-operation of the headlamp switch 21. The use of the mode selector eliminates an unwanted warning signal after the driver of user realizes which of the headlamps 11 is malfunctioning.

When either of the headlamps 11 is found to be malfunctioning, the headlamp ECU 1 may control the operations of both the headlamps 11 at the same time in a selected one of the warning lighting modes to inform the user of the malfunction of either of the headlamps 11.

What is claimed is:

1. A lighting control apparatus for a vehicle comprising:
a diagnosis circuit which diagnoses a malfunction of a light source which includes a plurality of lighting devices and emits light outside a vehicle;
a vehicle state determining circuit which determines a state of the vehicle; and
a malfunction warning circuit which operates the light source in one of predetermined warning lighting modes which is selected based on the state of the vehicle when the light source is determined by the diagnosis circuit as being malfunctioning; wherein
the predetermined warning lighting modes comprise a flashing mode where the light source with the malfunction is flashed for a specified period of time.

2. A lighting control apparatus as set forth in claim 1, wherein the vehicle state determining circuit determines whether the vehicle is running or not as the state of the vehicle.

3. A lighting control apparatus as set forth in claim 2, wherein when the vehicle state determining circuit determines that the vehicle is running, the malfunction warning circuit is prohibited from operating the light source in one of the warning lighting modes.

4. A lighting control apparatus as set forth in claim 1, wherein the vehicle state determining circuit determines whether a vehicle user is getting in or out of the vehicle or not as the state of the vehicle.

5. A lighting control apparatus as set forth in claim 1, further comprising a vehicle detector which detects the presence of another vehicle within an area illuminated by the light source, and wherein when no vehicle is detected in the area by the vehicle detector, and the light source is determined by the diagnosis circuit as being malfunctioning, the malfunction warning circuit changes orientation of a beam of the light emitted by the light source.

6. A lighting control apparatus as set forth in claim 1, wherein the light source is installed in a headlamp of the vehicle.

7. A lighting control system as set forth in claim 1, wherein the predetermined warning lighting modes comprise a luminance mode where a luminance of the light source with the malfunction is changed for a specified period of time and a swiveled mode where the light source with the malfunction is swiveled for a specified period of time.

8. A lighting control apparatus for a vehicle comprising:
a diagnosis circuit which diagnoses a malfunction of each of a plurality of light sources each of which includes a plurality of lighting devices and which emit light outside a vehicle;
a vehicle state determining circuit which determines a state of the vehicle; and
a malfunction warning circuit which, when one of the light sources is diagnosed as being malfunctioning, operates only the one of the light sources in one of predetermined warning lighting modes which is selected based on the state of the vehicle; wherein
the predetermined warning lighting modes comprise a flashing mode where the light source with the malfunction is flashed for a specified period of time.

9. A lighting control system as set forth in claim 8, wherein the predetermined warning lighting modes comprise a luminance mode where a luminance of the light source with the malfunction is changed for a specified period of time and a swiveled mode where the light source with the malfunction is swiveled for a specified period of time.

10. A lighting control system for a vehicle comprising:
a light source which includes a plurality of lighting devices and which emits light outside a vehicle;
an operating state sensor which monitors an operating state of the light source;
a vehicle state monitor which monitors a state of the vehicle to provide a signal indicative thereof; and
a lighting control apparatus which includes (a) a diagnosis circuit which diagnoses a malfunction of the light source based on the operating state of the light source, as monitored by the operating state sensor; (b) a vehicle state determining circuit which determines the state of the vehicle based on the signal outputted from the vehicle state monitor; and (c) a malfunction warning circuit which operates the light source in one of predetermined warning lighting modes which is selected based on the state of the vehicle when the light source is determined by the diagnosis circuit as being malfunctioning; wherein
the predetermined warning lighting modes comprise a flashing mode where the light source with the malfunction is flashed for a specified period of time.

11. A lighting control system as set forth in claim 10, wherein the predetermined warning lighting modes comprise a luminance mode where a luminance of the light source with the malfunction is changed for a specified period of time and a swiveled mode where the light source with the malfunction is swiveled for a specified period of time.

* * * * *